July 28, 1959 W. M. ATWATER ET AL 2,896,996
FOWL TRANSPORTER
Filed April 24, 1958 2 Sheets-Sheet 1
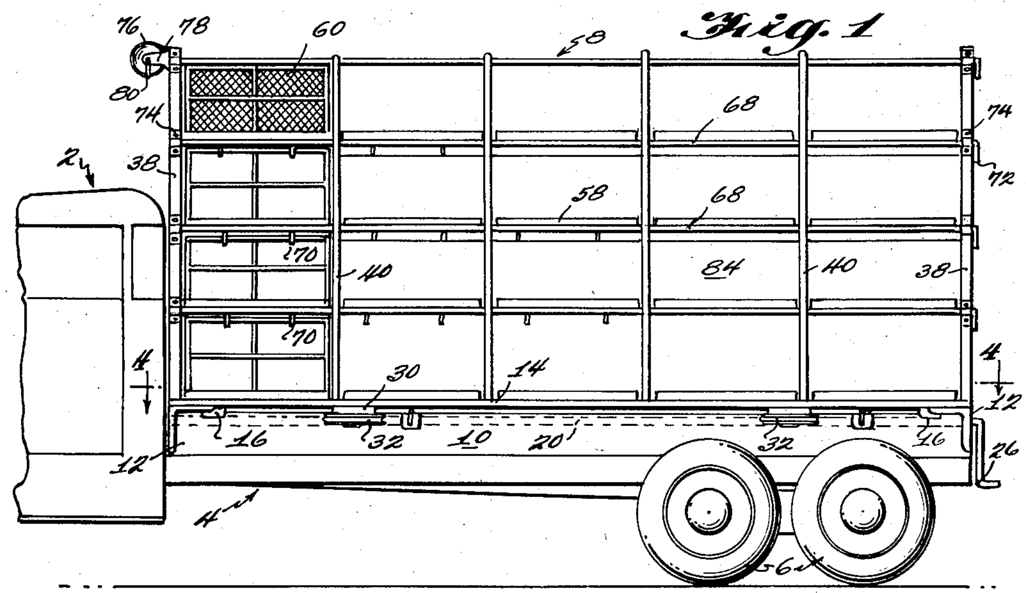
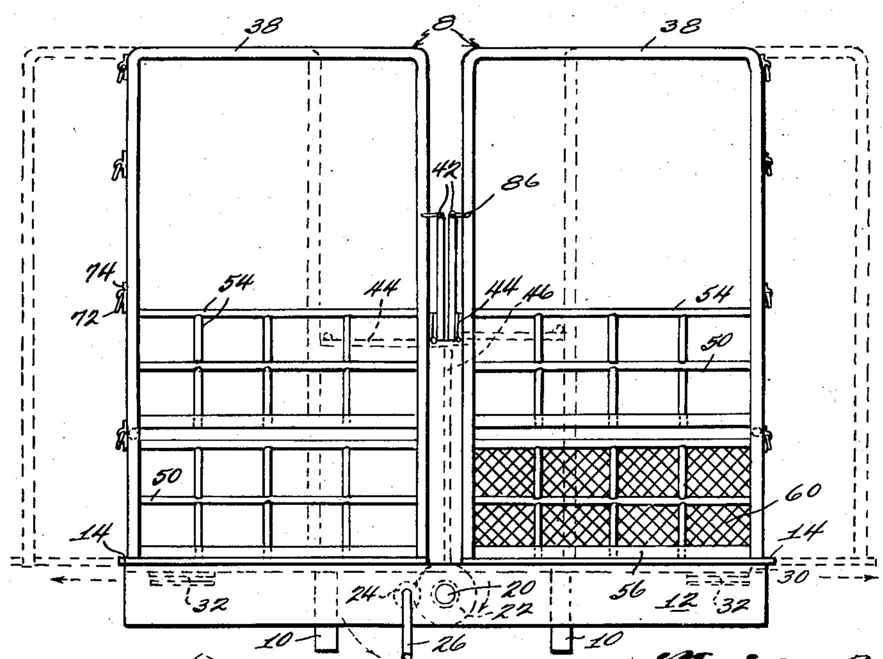
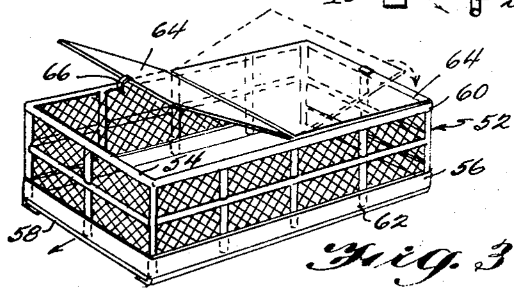
INVENTOR
WILLIAM M. ATWATER
PAUL BLAND McCOY
BY
J. Gibson Semmes
ATTORNEY

FOWL TRANSPORTER

Filed April 24, 1958 2 Sheets-Sheet 2

INVENTOR
WILLIAM M. ATWATER
PAUL BLAND McCOY

BY J. Gibson Semmes
ATTORNEY

United States Patent Office 2,896,996

Patented July 28, 1959

1

2,896,996

FOWL TRANSPORTER

William M. Atwater, Pittsboro, and Paul B. McCoy, New Hill, N.C.

Application April 24, 1958, Serial No. 730,555

1 Claim. (Cl. 296—3)

This invention relates to an improved fowl transporter, particularly the body construction thereof.

Previous inventors have attempted to construct fowl transporter bodies which would enable safe and efficient transporting of fowl. Some of these constructions are adapted to the carrying of conventional wooden "chicken cages"; others are adapted to the carrying of fowl in special compartments. The major problem confronted by these inventors and the poultry industry is that the handling of fowl in conventional wooden chicken cages is expensive in terms of repair of the cages as well as injurious to the fowl. Generally, the fowl are inserted into the "chicken cages" and the cages, in turn, are stacked upon an open truck body. During unloading the "chicken cages" are handed down individually from an attendant on the truck to an attendant on the ground. Often, the "chicken cages" are thrown or severely jostled by the attendants, resulting in injury to the fowl and damage to the wooden cages. Due to tight proximity of the cages, stacked upon a truck body, circulation of air within many of the cages is practically nil. As a result, there is frequent suffocation among the fowl being transported.

According to our invention, a bi-sectional frame having cage compartments may be mounted upon a conventional truck body. A folding top "chicken cage" is removably retained in each cage compartment. The frame sections are transversely separable so as to provide inner access to adjoining section sides. Additionally, we have provided a folding platform which may be attached to one or both of the adjoining sections sides. Loading or unloading of the fowl from the cages may be accomplished from the outer as well as the inner sides of the sections. Access to the upper tiers of the inner section is provided by means of our folding platform. Our unique separating means, in addition to providing access for loading and unloading of fowl, also permits interior ventilation of the cages during periods when the truck is not in motion.

The result of our invention may be distinguished from previous similar devices in that in the latter access to the cages or compartments was principally from the sides or ends of the truck body. Our invention provides interior access to removable cages and this access is facilitated by a folding platform.

Accordingly, an important object of the invention is to provide in a fowl transporter means for separating cages, thus assisting in loading and unloading of fowl and permitting ventilation of cages.

Another object of invention is to provide in a fowl transporter interior access to the tiers of stacked fowl cages.

Another object of invention is to provide in a fowl transporter a frame for carrying fowl cages, said frame permitting both inner and outer access to tiers of stacked fowl cages.

Another object of invention is to provide a fowl transporter wherein fowl may be loaded or unloaded by a single person without recourse to use of special ladders and the like.

Another object of invention is to provide in a fowl transporter cage compartments having removably retained therein sliding cages which are accessible from either end of the cage compartments for loading or unloading of fowl.

In the accompanying drawings, forming a part of this specification, and in which like numerals are employed to designate like parts throughout the same, Fig. 1 is a side elevation, in partial detail, of a fowl carrier embodying our invention.

Fig. 2 is an enlarged rear elevation of same.

Fig. 3 is a perspective view of a fowl cage, removed from the cage compartment.

Figure 4:
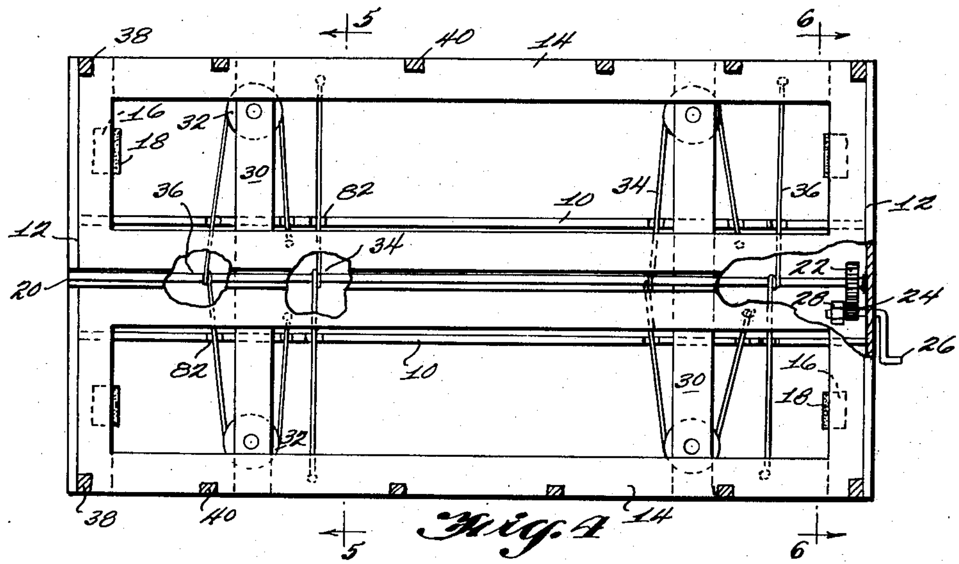
Fig. 4 is a plan view, taken along line 4—4 of Fig. 1, partially fragmentary, showing the rectangular bases of the frame sections and section separating means, as may be mounted upon a truck chassis.
Figure 5:
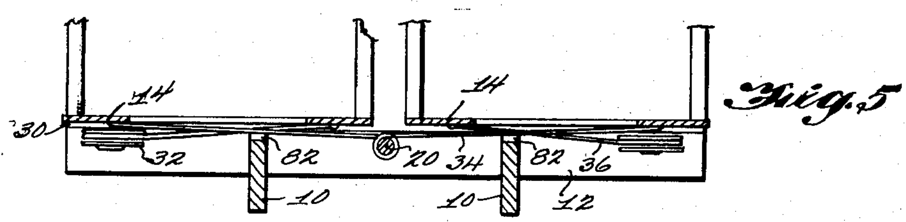
Fig. 5 is a sectional view taken along line 5—5 of Fig. 4, showing frame section bases and separating means attached thereto.
Figure 6:
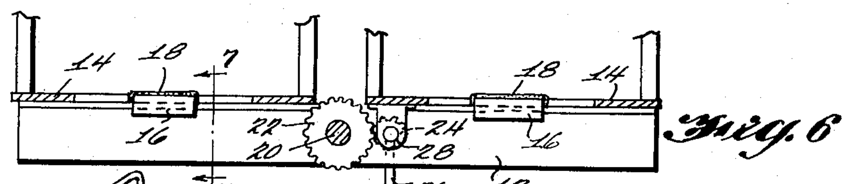
Fig. 6 is a sectional view taken along the line 6—6 of Fig. 4 and showing spur gears and crank shaft positioned for separating frame sections.

In Fig. 1 a fowl transporter is generally represented as having a cab 2, a chassis 4, rear wheels 6 and a multi-sectional body 8 for carrying of fowl.

As illustrated in Figs. 1 and 2 our truck body 8 is comprised of longitudinal base beams 10 mounted upon truck chassis 4. At either end of base beams 10 there are secured transverse angle bars 12. Rectangular frame bases 14 slide transversely over base beams 10 and transverse angular bars 12, as indicated in Fig. 7.

Figure 7:
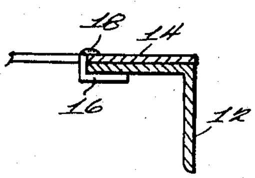
Fig. 7 is taken along line 7—7 of Fig. 6 and illustrates the fitting of a frame section upon transverse angle bars.

As will be apparent in Fig. 4 and Fig. 7 our truck body 8 is bi-sectional, each section having a rectangular base 14 secured to transverse angle bars 12 by means of brackets 16 which may be welded to the rectangular base as at 18. Also partially supporting rectangular bases 14 are transverse tracks 30, which are secured to longitudinal base beams 10 and upon which tracks rectangular bases 14 slide transversely.

Rotatably mounted in and between transverse angle bars 12 is a longitudinal crank shaft 20, juxtaposed with transverse tracks 30. Mounted on the rear end of crank shaft 20 is driven spur gear 22, driven by means of driving spur gear 24 attached to crank 26 which may be rotatably mounted in base frame 14 by means of bracket 28.

Rotatably secured to the under side of transverse tracks 30 are concave grooved pulleys 32. Attached to the rectangular bases 14 and wound around crank shaft 20 are joining cables 34 and separating cables 36. By turning of crank 26, the frame sections may be separated transversely to the position indicated in phantom in Fig. 2. Manifestly, various other means such as hydraulic means or gravitational means may be employed for separating and joining the sections of the frame.

Figure 8:
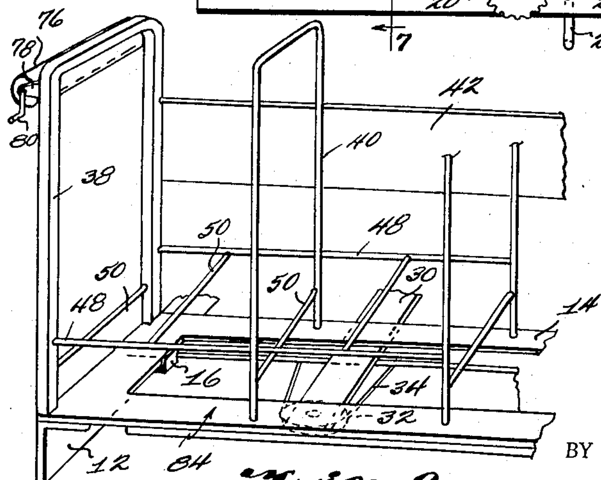
Fig. 8 is a fragmentary perspective view showing U-shaped frame members and interconnecting stringers defining cage compartments.

As illustrated in Fig. 8 the upstanding portion of our body frame 8 is comprised of U-shaped end compartment frames 38 and U-shaped intermediate frames 40. These U-shaped frames are stabilized by longitudinal stringers 48 and lateral stringers 50 positioned therebetween. These longitudinal and lateral stringers define a cage compartment 84.

As illustrated in Fig. 2, folding platforms 42 are attached to abutting interior sides of frame sections by means of hinges 44. Platforms 42 may have a folding supporting leg 46 hingedly attached thereto for support of the platform in its horizontal position during separation of the frame sections. We prefer to employ two folding platforms 42 which when not in use may be secured to the section frame by means of hooks 86 or the like. A single folding platform may be employed for this purpose and in place of a supporting leg 46, a hook or other fastening means may be fixed to the opposite frame section for support of platform 42 in its horizontal position.

As illustrated in Fig. 3, our unique fowl basket 52 comprises a metallic frame 54, having footing 56 enclosing angle bar base 62. Case floor 58 may be constructed of sheet metal, plywood or the like and is removable for the purposes of cleaning and recovering of chicken manure as a byproduct of the fowl transporting operation. The cage frame may be covered with metallic screening 60 such as "chicken wire." The cage top 64 is hinged at its middle and has at either end a clip fastener 66. Thus, when the frame sections are separated, the cage may be removed partially from either side of a cage compartment. With the cage partially removed, the exposed end of top 64 may be opened for insertion or removal of fowl. Normally, the cage is not removed entirely from the frame section except for cleaning purposes. In loading of fowl the operator of the vehicle may enter a fowl enclosure and grasp three or four fowl in a hand and approach a fowl cage 52, pulling same partially from the frame section, opening top 64 and inserting the fowl therein. Unloading is accomplished similarly, the vehicle operator pulling three or four fowls simultaneously from a cage basket and carrying same to an enclosure at his destination. As will be apparent, our invention eliminates the necessity for stacking and handling of fowl cages with its corresponding injury to fowl and damage to the cages. Access to the fowl cages may be had without a loading or unloading platform. A tailgate (not illustrated) may be hinged at the rear of our body 8 and this tailgate when the sections are separated will provide a ramp to the separate frame sections. At the same time access may be had to upper tiers of cages in the separated sections by means of loading platform 42 fastened in its horizontal position.

As illustrated in Fig. 1 fowl cages 52 may be retained in position during travel by means of longitudinal locking bars 68 rotatably mounted in brackets 74 and having handle 72 and locking bar clasps 70 which clasp the cage frame members 54 and thus hold the cages in place.

Also, as illustrated in Fig. 1, a rolled canvas cover 76 may be rotatably mounted in brackets 78 at the front of each frame section. During travel canvas cover 76 may be unrolled to extend over the top and rear end of each frame section, thus providing protection against the elements. The sides of each frame section are left uncovered so as to provide adequate ventilation. Upon arrival at the destination the canvas cover 76 may be immediately rolled by means of crank 80 and the frame sections separated to provide maximum ventilation of the fowl.

It is to be understood that the form of our invention, herewith shown and described, is to be taken as a preferred example of the same, that the invention may be applied to the transporting of small animals as well and that various modifications in the shape and size and arrangements of parts may be resorted to, without departing from the spirit of our invention or the scope of the subjoined claim.

Having thus described our invention, we claim:

In a fowl transporter, a sectional frame having fowl cage compartments: transverse tracks mounted upon the the transporter chassis and slidably supporting sections of said frame; hinged top, removable bottom fowl cages slidably contained in said compartments; a crank shaft juxtaposed with said transverse tracks; cable and pulley means interconnecting said sections of said frame and said crank shaft, said crank shaft selectively separating and joining said sections; and a folding platform attached to an abutting side of one of said sections, outer access to said slidably contained cages within said sections being from without the transporter and inner access being provided by separation of said sections and being facilitated by said folding platform.

References Cited in the file of this patent

UNITED STATES PATENTS

| | | |
|---|---|---|
| Re. 24,452 | Meaker | Apr. 8, 1958 |
| 1,432,439 | Bixler | Oct. 17, 1922 |
| 2,147,892 | Gray | Feb. 21, 1939 |
| 2,446,800 | Arrighi | Aug. 10, 1948 |
| 2,704,223 | Houdart | Mar. 15, 1955 |

FOREIGN PATENTS

| | | |
|---|---|---|
| 822,772 | France | Sept. 27, 1937 |
| 554,355 | Germany | July 7, 1932 |